United States Patent Office 3,686,267
Patented Aug. 22, 1972

3,686,267
AMMOXIDATION OF SATURATED
HYDROCARBONS
Keith M. Taylor, Ballwin, Mo., assignor to
Monsanto Company, St. Louis, Mo.
No Drawing. Filed Nov. 17, 1969, Ser. No. 377,466
Int. Cl. C07c 121/02, 121/32
U.S. Cl. 260—465.3
5 Claims

ABSTRACT OF THE DISCLOSURE

Method for the production of acrylonitrile or methacrylonitrile from propane or isobutane employing sulfur or a sulfur containing compound and a metal oxide.

BACKGROUND OF THE INVENTION

This invention relates to the ammoxidation of saturated hydrocarbons to form unsaturated nitriles and particularly alpha, beta-unsaturated nitriles.

The value of unsaturated nitriles is generally recognized. Acrylonitrile is among the most valuable monomers available for producing polymeric products and particularly has value in the preparation of synthetic fibers, synthetic rubbers and other materials useful in the preparation of films, moldings and the like.

Many processes, catalytic and non-catalytic, are known and practiced for the manufacture of unsaturated nitriles. Most generally such nitriles are commercially obtained by the catalytic ammoxidation of unsaturated hydrocarbons in the vapor phase wherein an olefin is reacted with ammonia in the presence of oxygen and a catalyst. When producing acrylonitrile the olefin is propylene and when producing methacrylonitrile the olefin is generally isobutylene.

Saturated hydrocarbons, as a source of carbon, are lower in cost and are more abundant than unsaturated hydrocarbons or any other material useful as a starting material in the manufacture of unsaturated nitriles. Therefore, it is readily recognized that a feasible process for producing unsaturated nitriles directly from saturated hydrocarbons would be highly desirable commercially.

In the past, extensive work has been done in the development, particularly with regard to catalysts, of the ammoxidation of olefins and only recently has consideration been directed to the ammoxidation of saturated hydrocarbons to form unsaturated nitriles. However, the reported work in this latter area has not disclosed a commercially feasible process because the yield of unsaturated nitriles obtained is relatively low. For example, United States Pat. 3,365,482 discloses the use of molybdenum oxide and tungsten oxide as catalysts for the ammoxidation of saturated hydrocarbons to unsaturated nitriles. However, it is observed from this patent that the reported yield of acrylonitrile, based on the propane converted, is low. As pointed out in this patent and clearly recognized by the skilled artisan, many catalysts are known which with comparative ease effect the ammoxidation of unsaturated hydrocarbons to produce unsaturated nitriles but do not effect the ammoxidation of saturated hydrocarbons because the saturated hydrocarbons do not have a reactivity comparable to unsaturated hydrocarbons in the presence of the same catalysts to form unsaturated nitriles.

Copending application Ser. No. 788,083, filed Dec. 30, 1968, now abandoned, discloses and claims the ammoxidation of saturated hydrocarbons in the presence of an antimony-uranium containing catalyst. A suitable antimony-uranium containing catalyst is disclosed in United States Pat. No. 3,198,750.

SUMMARY

This invention is directed to a vapor phase process wherein saturated hydrocarbons, particularly saturated acyclic hydrocarbons, are reacted with ammonia and oxygen in the presence of sulfur and a metal containing catalyst to produce, at least in part, unsaturated nitriles and particularly, alpha, beta-unsaturated nitriles. Particularly, this invention is directed to conversion of propane to acrylonitrile and isobutane to methacrylonitrile.

Accordingly, typical objects of this invention are to provide: (1) an improved vapor phase process for the production of unsaturated nitriles, (2) a vapor phase ammoxidation process for converting saturated hydrocarbons directly to unsaturated nitriles, and (3) a vapor phase ammoxidation process for the production of acrylonitrile directly from propane.

Other objects, aspects and advantages of this invention will become apparent to those skilled in the art upon further study of this disclosure and the appended claims.

In accordance with this invention, in one aspect, saturated hydrocarbons, particularly acyclic paraffins, having from 3 to 12 carbon atoms per molecule, are ammoxidized directly in a one step process to unsaturated nitriles by a vapor phase reaction with ammonia and oxygen in the presence of sulfur or a sulfur containing compound and a metal containing catalyst. Generally, the metals in the catalyst are present as oxides, however, they may also be present as phosphates or sulfates, combinations of oxides, phosphates and sulfates, as complexes, or in any form leading to the above forms under reaction conditions.

Various metals have been found to be effective in the conversion of saturated hydrocarbons to unsaturated nitriles. Generally, two or more metals are used in combination. Presently, antimony is preferred as a component in any such catalyst. Useful with antimony are the elements tin, titanium, uranium, cerium, iron, thorium, manganese, bismuth, thallium, zinc, lead, cadmium, cobalt, nickel and vanadium. However, combinations such as molybdenum-boron-tin, and iron-bismuth, are effective catalysts. Also the elements antimony, molybdenum and tungsten are useful alone.

The catalysts can be employed with or without support. When used with a support, preferably the support comprises 10 to 90% by weight of the catalyst. Any known catalyst support material can be used such as, silica, alumina, zirconia, alundum, silicon carbide, silica-alumina, aluminates, borates and carbonates, stable under the reaction conditions encountered in the process in which the catalyst is used.

The metal oxides, phosphates, sulfates or the like can be formed separately or together in situ. A catalyst containing antimony and uranium in an atomic ratio of 1Sb:1U to 99Sb:1U and preferably 1Sb:1U to 25Sb:1U has been found to be exceptionally effective in this invention. As starting materials for the antimony component, for example, there can be used an antimony oxide, such as antimony trioxide, antimony tetroxide, and antimony pentoxide or mixtures thereof, or any antimony phosphates; or a hydrous antimony oxide, meta-antimonic acid, orthoantimonic acid, or pyroantimonic acid; or a hydrolyzable or decomposable antimony salt, such as an antimony halide, for example, antimony trichloride, trifluoride or tribromide; antimony pentachloride or antimony pentafluoride, which is hydrolyzable in water to form the hydrous oxide. Antimony metal can be employed with the hydrous oxide being formed by oxidizing the metal with an oxidizing acid such as nitric acid. The uranium component can be provided in the form of uranium oxide or by precipitation in situ from a soluble uranium salt such as the nitrate, acetate or a halide such as the chloride. Uranium metal can be used as a starting material, and if antimony metal is also employed, the antimony can be converted to the oxide and uranium to the nitrate by oxidation in hot nitric acid.

The activity of the catalyst system is enhanced by heating at an elevated temperature. Preferably the catalyst mixture is dried and heated at a temperature of from about 250 to about 650° C. for from 2 to 24 hours and then calcined at a temperature from about 700 to about 900° C. for from 2 to 24 hours.

The reactants in the process of this invention are saturated hydrocarbons, particularly saturated acyclic hydrocarbons, having from 3 to 12 carbon atoms per molecule, ammonia and oxygen. One or more saturated hydrocarbons may be employed as a reactant. The molar ratio of the reactants hydrocarbon:ammonia:oxygen employed in the process of this invention is in the range of 1:0.5:0.5 to 1:6:8 and preferably in the range of 1:1:1.5 to 1:3:4. The saturated hydrocarbon feed should be substantially free of unsaturated hydrocarbon for best conversion and optimum yield of the desired unsaturated nitrile. The present invention is, therefore, not to be confused with the developed art directed to olefin ammoxidation processes which unanimously teach that saturated hydrocarbons in the olefin feed are inert to the reaction and apparently serve as a diluent.

While ammonia is most generally employed as the nitrogen providing compound, other materials may be employed. For example, ammonia may be generated in use from decomposable ammonium compounds such as ammonium carbonate, or from various amines, such as methyl amine, ethyl amine and aniline. Any source of oxygen, pure or in admixture with inerts, may be employed in the process of this invention. Air is a satisfactory source of oxygen for use in this invention.

Elemental sulfur or volatile sulfur containing compounds can be employed in the process of this invention. A volatile organic or inorganic sulfur compound can be used. Typical examples of suitable organic compounds are the alkyl- or dialkyl- sulfides and mercaptans wherein the alkyl substituent contains 1 to 12 carbon atoms and include methyl mercaptan, dimethyl sulfide, ethyl mercaptan, ethyl sulfide, propyl sulfide, propyl mercaptan and the like. Examples of suitable inorganic sulfides are hydrogen sulfide and ammonium sulfide. Sulfur dioxide also may be used. The mol ratio of sulfur or sulfur compound:saturated hydrocarbon used will generally be in the range of 0.00005:1 to 0.05:1 and preferably 0.0005:1 to 0.01:1.

As previously stated, the process of this invention is carried out as a vapor phase reaction. Accordingly, any apparatus of the type suitable for carrying out oxidation reactions in the vapor phase may be employed for the practice of the process. The process may be operated continuously or intermittently, and may employ a fixed bed with a large particulate or pelleted catalyst, or a so-called "fluidized" bed of catalyst with finely divided catalyst. The latter type is presently preferred for use with the process of this invention as it permits closer control of the temperature of the reaction.

The process of this invention is carried out at a temperature in the range of from about 300° C. to about 650° C. Preferably, the reaction is conducted at a temperature in the range of from about 375° C. to about 550° C.

Pressures other than atmospheric may be employed in the process of this invention, however, it will generally be preferred to conduct the reaction at or near atmospheric pressure, since the reaction proceeds well at such pressure and the use of expensive high pressure equipment is avoided.

The contact time between the reactants and catalyst employed in the process of this invention may be selected from a broad operable range which may vary from about 0.1 to about 50 seconds. The contact time may be defined as the length of time in seconds which the unit volume of reactant gases measured under reaction conditions is in contact with the volume of catalyst employed. The optimum contact time will, of course, vary depending upon the hydrocarbon being reacted, the catalyst and the reaction temperature. In the case of converting propane to acrylonitrile, the contact time will preferably be within the range of 0.5 to 20 seconds.

The reactor employed may be brought to the desired reactor temperature before or after the introduction of the vapors to be reacted. Preferably, the process is conducted in a continuous manner with the unreacted feed materials being recirculated. Also, the activity of the catalyst may be regenerated by contacting the catalyst with air at elevated temperatures.

The products of the reaction may be recovered from the effluent gas by any appropriate method and means known to the art and further elucidation here will be unnecessary duplication of the art.

DESCRIPTION OF PREFERRED EMBODIMENTS

The following examples are given as illustrative of the invention and, as such, specifics presented therein are not intended to be unduly considered limitations upon the scope of this invention.

In the following examples, the reactor used is a concentric tube system fabricated from 96% quartz tubing. The inner tube is ½" by 12" and the outer tube is 1" diameter. The reactor unit is supported in a vertical 1" tube furnace. Heat control of the reactor is accomplished by fluidizing Fisher "sea" sand in the shell side of the reactor unit. The reaction temperatures given in the examples are measured by a thermocouple in the center of the reactor. Prior to entering the reactor, the reactant gases are mixed in standard Swagelock stainless steel "T's" and introduced into the bottom of the reactor through a coarse quartz fritted tube. The effluent gases from the reactor are chromatographically analyzed.

EXAMPLE I

This example illustrates the conversion of propane directly to acrylonitrile in accordance with this invention.

The feed to the reactor contains propane, ammonia, air and hydrogen sulfide. The volume ratio of propane: ammonia is 1:1.2, the volume ratio of propane:air is 1:12, and the mol ratio of hydrogen sulfide:propane is 0.001:1. The reactor contains 6 cc. of a commercial antimony-uranium catalyst having a nominal atomic ratio of 4.9 Sb:1U and is a product of Girdler Catalysts Division of Chemetron Corporation identified as AN Catalyst 21. The variables of reaction temperature and contact times are shown in Table I which also sets forth the results of the reaction.

TABLE I

| Contact time (seconds) | Reactor temperature (° C.) | Propane [1] conversion, percent | Acrylonitrile | |
|---|---|---|---|---|
| | | | Single pass [2] yield percent | Ultimate [3] yield percent |
| 5 | 500 | 13.4 | 9.3 | 69.3 |
| 10 | | 24.8 | 15.7 | 63.2 |
| 15 | | 43.6 | 23.6 | 54.0 |
| 20 | | 54.4 | 27.4 | 50.5 |
| 5 | 550 | 70.0 | 31.0 | 44.2 |

[1,2,3] See footnotes bottom of Table IV.

EXAMPLE II

Example I is repeated except that the mol ratio of hydrogen sulfide:propane is 0.002:1. The results are set forth in Table II.

TABLE II

| Contact time (seconds) | Reactor temperature (° C.) | Propane[1] conversion, percent | Acrylonitrile Single pass[2] yield percent | Acrylonitrile Ultimate[3] yield percent |
|---|---|---|---|---|
| 5 | 500 | 10.3 | 7.6 | 73.8 |
| 10 | | 17.7 | 14.0 | 79.0 |
| 15 | | 28.5 | 19.4 | 68.0 |
| 20 | | 59.6 | 30.2 | 50.6 |
| 5 | 550 | 75.4 | 29.0 | 38.4 |

[1][2][3] See footnotes bottom of Table IV.

EXAMPLE III

Example I is repeated except that the mol ratio of hydrogen sulfide:propane is 0.004:1. The results are set forth in Table III.

TABLE III

| Contact time (seconds) | Reactor temperature (° C.) | Propane[1] conversion, percent | Acrylonitrile Single pass[2] yield percent | Acrylonitrile Ultimate[3] yield percent |
|---|---|---|---|---|
| 5 | 500 | 15.0 | 11.8 | 78.4 |
| 10 | | 25.1 | 17.9 | 71.4 |
| 15 | | 50.5 | 23.2 | 45.8 |
| 20 | | 67.0 | 28.6 | 42.6 |
| 5 | 550 | 71.8 | 32.5 | 45.3 |

[1][2][3] See footnotes bottom of Table IV.

EXAMPLE IV

This example illustrates the preparation of a catalyst consisting essentially of the oxides of antimony and uranium in an atomic ratio of Sb:U of 5:1.

A solution is prepared by dissolving 8 grams of uranyl acetate in 80 cc. of water. This solution is thoroughly mixed with 50 cc. of 30% silica sol. To this mixture is added 30 grams of antimony pentachloride dropwise while the mixture is being stirred. Finally, 50 cc. of ammonium hydroxide is stirred into the mixture. The mixture is evaporated to near dryness and then dried in a vacuum oven at 110° C. for 24 hours. The dried catalyst is then calcined under air at 800° C. for 4 hours.

EXAMPLE V

Example I is repeated except that 3.0 grams of the catalyst of Example IV is used in the reactor and no sulfur or sulfur compound is introduced into the reactor. The results are set forth in Table IV.

TABLE IV

| Contact time (seconds) | Reactor temperature (° C.) | Propane[1] conversion, percent | Acrylonitrile Single pass[2] yield percent | Acrylonitrile Ultimate[3] yield percent |
|---|---|---|---|---|
| 1 | 500 | 3.5 | 2.4 | 67.8 |
| 5 | | 14.9 | 8.2 | 54.9 |
| 10 | | 21.4 | 10.5 | 48.7 |
| 1 | 550 | 9.8 | 5.7 | 58.0 |
| 5 | | 51.9 | 17.0 | 32.7 |
| 10 | | 70.9 | 10.4 | 14.3 |
| 1 | 600 | 35.2 | 5.1 | 14.4 |

[1] Propane conversion percent
$$= \frac{\text{Mols propane in feed} - \text{mols propane in effluent}}{\text{Mols propane in feed}} \times 100$$

[2] Acrylonitrile single pass yield percent
$$= \frac{\text{Mols acrylonitrile in effluent}}{\text{Mols propane in feed}} \times 100$$

[3] Acrylonitrile ultimate yield percent
$$= \frac{\text{Acrylonitrile single pass yield percent}}{\text{Propane conversion percent}} \times 100$$

From the above examples, it is readily apparent that the use of sulfur in the ammoxidation of saturated hydrocarbons using an antimony-uranium catalyst markedly improves the conversion of the saturated hydrocarbons and yield of unsaturated nitriles.

It will be obvious to persons skilled in the art that various modifications may be made in the improved catalyst and process as described in this application. Accordingly, it is intended that all such modifications which reasonably fall within the scope of the appended claims are included herein.

I claim:

1. A process for the preparation of acrylonitrile or methacrylonitrile which comprises reacting in the vapor phase at a temperature of from about 300° C. to about 650° C. a hydrocarbon consisting of propane or isobutane, with ammonia and a molecular oxygen containing gas, in a molar ratio of hydrocarbon:ammonia:oxygen of from about 1:0.5:0.5 to about 1:6:8, in the presence of an ammoxidation catalyst and a minor quantity of a sulfur containing component; wherein said ammoxidation catalyst is (i) an oxide of a metal selected from the group consisting of antimony, molybdenum and tungsten (ii) a mixture of antimony oxide and the oxide of at least one metal selected from the group consisting of tin, titanium, uranium, cerium, iron, thorium, manganese, bismuth, thallium, zinc, lead, cadmium, cobalt, nickel and vanadium, or (iii) a mixture of the oxides of molybdenum, boron and tin or of iron and bismuth; wherein said sulfur containing component consists essentially of at least one of elemental sulfur, sulfides represented by the formula R—S—R' wherein R is a 1 to 12 carbon atom alkyl group and R' is a 1 to 12 carbon atom alkyl group, mercaptans represented by the formula RSH wherein R is 1 to 12 carbon atom alkyl group, hydrogen sulfide, ammonium sulfide or sulfur dioxide; and wherein the molar ratio of said sulfur containing component to hydrocarbon is from 0.00005:1 to 0.05:1.

2. The process of claim 1 wherein said ammoxidation catalyst is carried on a catalyst support.

3. The process of claim 2 wherein said catalyst support is silica.

4. The process of claim 1 wherein said ammoxidation catalyst is a mixture of antimony oxide and uranium oxide, the atomic ratio of antimony to uranium being from 1:1 to 25:1.

5. The process of claim 4 wherein acrylonitrile is produced, said hydrocarbon is propane and said sulfur containing component is hydrogen sulfide.

References Cited

UNITED STATES PATENTS

| | | | |
|---|---|---|---|
| 3,118,928 | 1/1964 | Garrison, Jr. | 260—465.3 |
| 3,142,697 | 7/1964 | Jennings et al. | 260—465.3 |
| 3,161,670 | 12/1964 | Adams et al. | 260—465.3 |
| 3,365,482 | 1/1968 | Khoobiar | 260—465.3 |
| 3,394,167 | 7/1968 | Palm et al. | 260—465.3 |
| 3,424,782 | 1/1969 | Ohmori et al. | 260—465.3 |
| 3,426,061 | 2/1969 | Gruber | 260—465.3 |
| 3,433,823 | 3/1969 | McMahon | 260—465.3 |

OTHER REFERENCES

Shatalova, et al., C.A., 70, (February 1969), p. 1531.

JOSEPH PAUL BRUST, Primary Examiner